United States Patent
Casalena et al.

(10) Patent No.: US 9,324,375 B1
(45) Date of Patent: Apr. 26, 2016

(54) DYNAMICALLY ADJUSTING STREAM QUALITY LEVEL

(75) Inventors: Dean Casalena, Cape Town (ZA); Donald Peregrine Clarke, Gilroy, CA (US); Barrett Gibson Lyon, Pacifica, CA (US)

(73) Assignee: TATA COMMUNICATIONS (AMERICA) INC., Herndon, VA (US)

( * ) Notice: Subject to any disclaimer, the term of this patent is extended or adjusted under 35 U.S.C. 154(b) by 807 days.

(21) Appl. No.: 12/381,677

(22) Filed: Mar. 13, 2009

(51) Int. Cl.
*G06F 15/16* (2006.01)
*G11B 27/038* (2006.01)

(52) U.S. Cl.
CPC .................................. *G11B 27/038* (2013.01)

(58) Field of Classification Search
CPC ................................................ H04L 29/06523
USPC .................................................. 709/231, 233
See application file for complete search history.

(56) References Cited

U.S. PATENT DOCUMENTS

| | | | |
|---|---|---|---|
| 7,023,488 B2* | 4/2006 | Szybiak et al. | 348/484 |
| 7,302,396 B1* | 11/2007 | Cooke | 704/500 |
| 7,548,948 B2* | 6/2009 | Klemets et al. | 709/203 |
| 7,725,557 B2* | 5/2010 | Klemets et al. | 709/213 |
| 7,818,355 B2 | 10/2010 | Mills et al. | |
| 8,412,812 B1* | 4/2013 | Mayers et al. | 709/224 |
| 2003/0236906 A1* | 12/2003 | Klemets et al. | 709/231 |
| 2004/0003101 A1* | 1/2004 | Roth et al. | 709/231 |
| 2006/0053253 A1* | 3/2006 | Roth et al. | 711/118 |
| 2006/0059223 A1* | 3/2006 | Klemets et al. | 709/200 |
| 2006/0064500 A1* | 3/2006 | Roth et al. | 709/231 |
| 2007/0086366 A1* | 4/2007 | Luo et al. | 370/260 |
| 2007/0162945 A1 | 7/2007 | Mills | |
| 2007/0192474 A1* | 8/2007 | Decasper et al. | 709/223 |
| 2008/0091845 A1 | 4/2008 | Mills et al. | |
| 2008/0232763 A1* | 9/2008 | Brady | 386/46 |
| 2008/0235200 A1 | 9/2008 | Washington et al. | |
| 2009/0013414 A1 | 1/2009 | Washington et al. | |
| 2009/0307367 A1* | 12/2009 | Gigliotti | 709/231 |
| 2010/0070608 A1 | 3/2010 | Hosur | |
| 2010/0094931 A1 | 4/2010 | Hosur et al. | |
| 2010/0142915 A1* | 6/2010 | McDermott et al. | 386/68 |
| 2010/0185776 A1 | 7/2010 | Hosur et al. | |

* cited by examiner

*Primary Examiner* — Douglas Blair
(74) *Attorney, Agent, or Firm* — Hubbs, Enatsky & Inoue PLLC (57) ABSTRACT

Dynamically adjusting stream quality level is disclosed. In some embodiments, playing media content includes playing a first stream having a first quality level of the media content, determining that a different available quality level of the media content would result in improved playback performance, and switching to playing a second stream having a second quality level of the media content.

20 Claims, 5 Drawing Sheets

FIG. 5B

DYNAMICALLY ADJUSTING STREAM QUALITY LEVEL

BACKGROUND OF THE INVENTION

A server hosting a media stream often publishes the stream in a single quality level or bitrate. Clients accessing the stream from the server may have varying resources, such as network connection speeds, available processing powers, etc., for receiving and playing back the stream. If a client does not have sufficient resources for the bitrate in which the stream is published, buffering problems and/or stuttering may occur at the client during playback, detrimentally affecting the end user experience.

In some cases, a server hosting media content may publish streams having a few different quality levels or bitrates to cater to clients having different Internet connection speeds (e.g., dial-up, broadband, etc.). In such cases, a user at a client requesting the content is typically prompted to select from a list of connection speeds or available bitrates and/or may be presented with an option to have a connection speed or available bitrate automatically selected. The requested content is then provided to the client with a bitrate that corresponds to the selection. In such cases, if a different quality level or bitrate stream of the same content is later desired by the client, the client must establish a new connection with a stream having the desired bitrate and receives data starting from the beginning of that stream.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Figure 1:
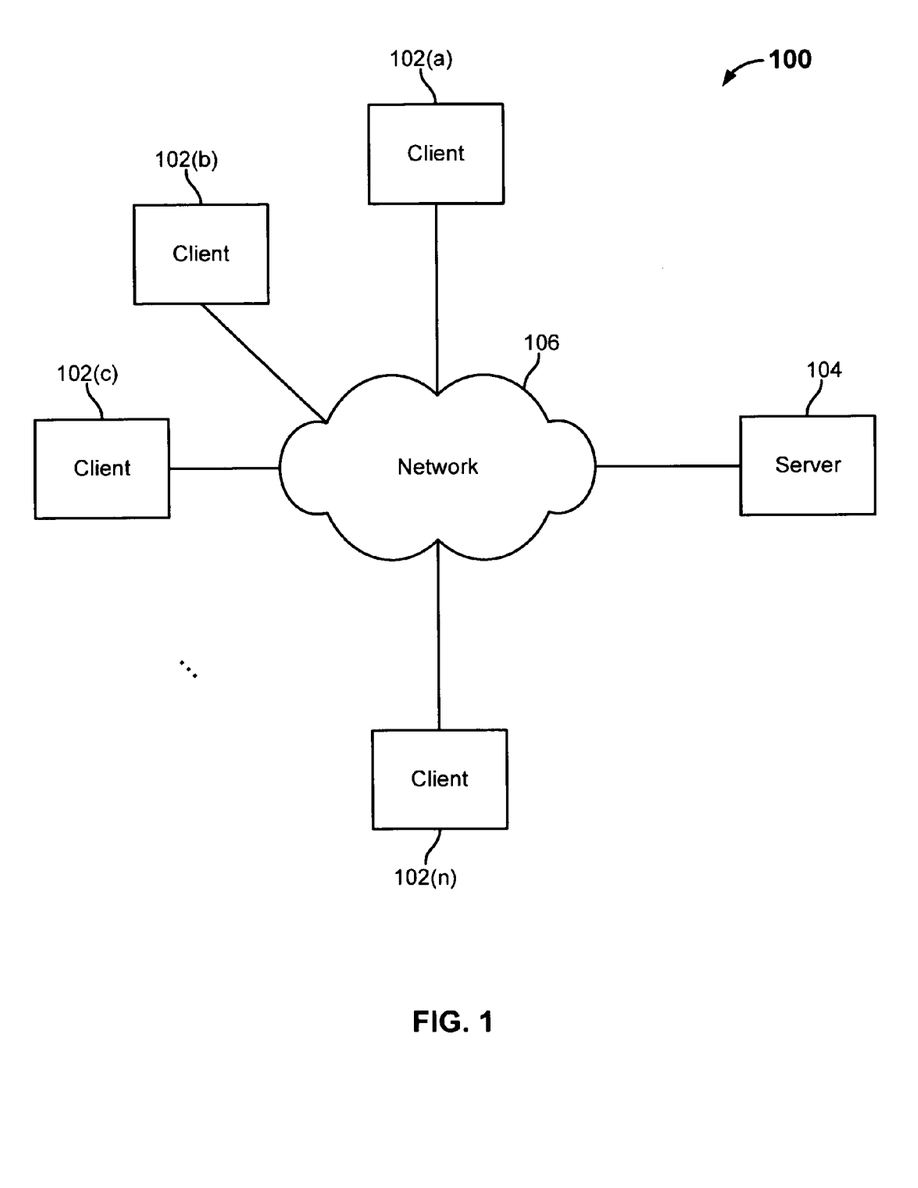
FIG. 1 is a block diagram illustrating an embodiment of a client-server network environment.

FIG. 1 is a block diagram illustrating an embodiment of a client-server network environment 100. Clients 102 and server 104 communicate via network 106, which may comprise a private or public network, such as a LAN, WAN, the Internet, etc. Although a single server 104 is depicted in the given example, server 104 may comprise a plurality of servers, one or more of which may be network connected. In some embodiments, server 104 comprises a streaming media server that services requests for media content from one or more clients 102. For example, server 104 may comprise a streaming video server. A requested media file or portion thereof received from server 104 may be played back at client 102 using an appropriate media player, which may support any one or more appropriate media file formats such as Flash video. The media player at the client-side, for example, may comprise an external application at client 102 or may comprise an embedded player in a website being accessed by client 102. In some embodiments, the media player at the client comprises a custom media player configured to dynamically adjust stream quality based on, for example, the availability of client resources as further described herein.

Various clients may have differing resources for receiving and playing back requested media content. To cater to such clients, in some embodiments, a plurality of streams having different quality levels or bitrates of the same media content is published by a server so that a stream quality level that can best be supported by a client can be provided to the client. However, various resources of a client, such as network connection speed and available processing power, are typically time variant. Thus, a single static determination of the stream quality level that a client can best support prior to providing a stream to the client in many cases results in a sub-optimal end user experience since such a determination may reflect the availability of resources at the client at the time the media content is requested. Moreover, such a determination may be based on polling the end user, who might not provide accurate feedback. Therefore, as further described herein, it is useful to automatically determine the stream quality level that a client can best support even while a stream of a given quality level is received and played back at the client and, when appropriate, to dynamically switch mid-stream to a different stream quality level so that a quality level that a client can best support at that time is provided to the client to improve end user experience.

The techniques described herein may be employed with respect to any type of streaming media content, such as streaming audio and video content, that is published in a plurality of quality levels. Each "quality level" corresponds to a different resolution or bitrate in which the media content is encoded. The various quality level streams correspond to different files of the same media content on an associated server. In various embodiments, the media content may comprise live content that is generated and provided in nearly real time, or the media content may comprise on-demand content that is pre-stored and provided upon request.

Figure 2:
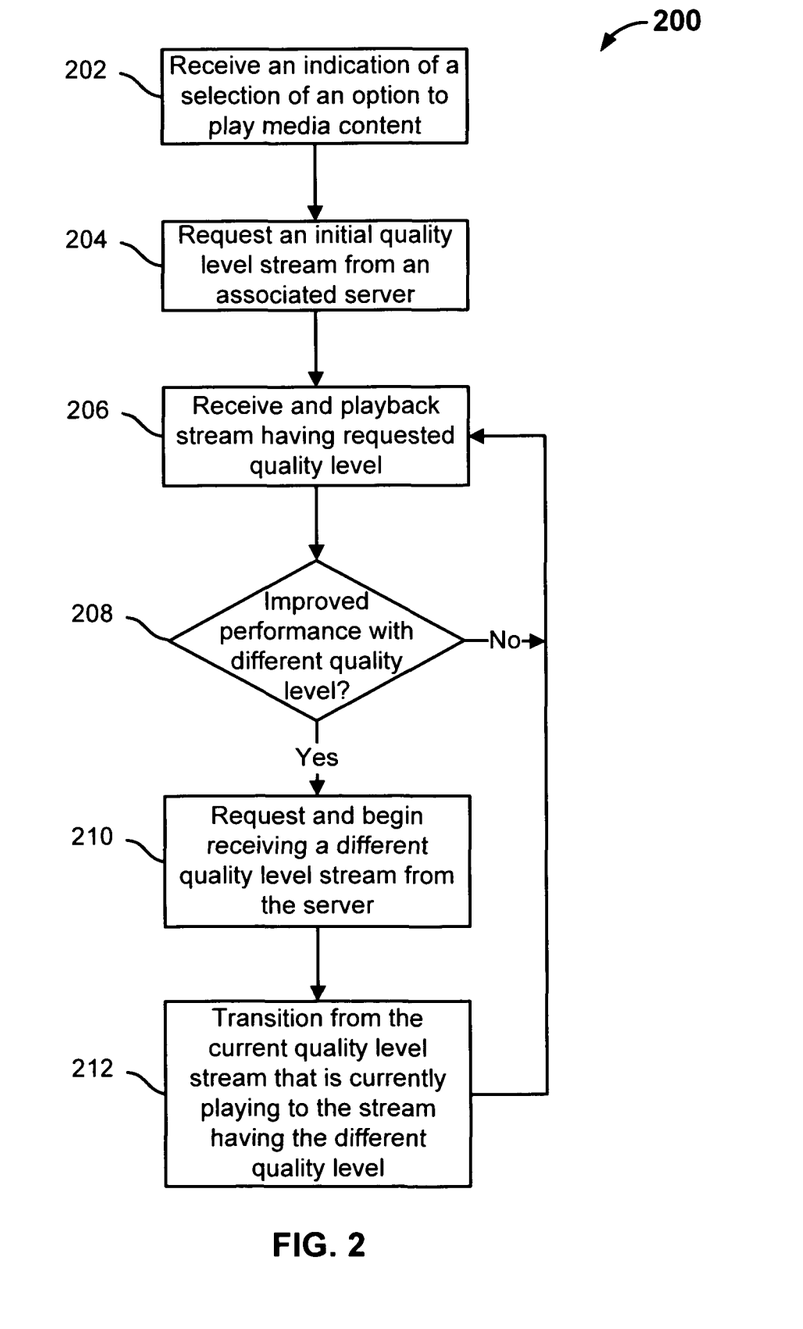
FIG. 2 illustrates an embodiment of a process for switching between different quality level streams.

FIG. 2 illustrates an embodiment of a process 200 for switching between different quality level streams of the same media content. In some embodiments, process 200 is employed client-side by a media player that plays requested media content. With respect to FIG. 1, for example, process 200 may be employed by a client 102 when receiving media content from server 104. Process 200 starts at 202 at which an indication of a selection of an option to play a media content is received. For example, the indication may be received in response to a user selecting an option to play the media content.

At 204, an initial quality level stream of the media content is requested from an associated server. In some embodiments, the initial quality level comprises the highest available quality level. In some embodiments, 204 includes selecting the initial quality level, e.g., from a set of quality levels published by the server. In some embodiments, the selection of the initial quality level is made by a user, for example, from a list of available quality levels. Alternatively, the selection of the initial quality level may indirectly be made by a user prompted to select from a list of network connection speeds or types. In such cases, different quality levels may be mapped to different network connection speeds or types, and a quality level can be inferred from the mapping when a network connection speed or type is indicated by the user. In some embodiments, the selection of the initial quality level is automatically made by the media player, e.g., based on the result of a network connection speed test. In some embodiments, the selection of the initial quality level is automatically made by a browser at the client, e.g., that is used by the user to navigate to and/or select the media content for playback. In some embodiments, the media player and/or the browser may be configured to store, e.g., via one or more cookies, information on quality levels previously requested by the client for streaming media content and use that information to select the initial quality level that is most likely to be appropriate for the client. In some cases, the browser may be configured to store network connection speed information obtained from the last network connection speed test conducted at the client, and that information may be used to select the initial quality level.

At 206, a stream having the requested quality level is received from the server and played back at the client. At 208, it is determined whether improved playback performance can be achieved with a different available quality level stream. In some embodiments, the determination of 208 is based at least in part on the current availability of one or more client resources, such as network connection speed, available processing power, etc. In some embodiments, a network connection speed test is conducted at 208 to make the determination of whether improved playback performance can be achieved with a stream having a different bitrate. If current client resources are insufficient for the current quality level stream being played, it may be determined at 208 that a lower quality level stream would result in improved playback performance at the client. If current client resources can support a better quality level than the current quality level stream being played, it may be determined at 208 that a higher quality level stream would result in improved playback performance at the client. In some embodiments, the determination of 208 is periodically made while a stream is being played and/or when buffering, stuttering, or other playback problems occur due to insufficient data. If it is determined at 208 that improved playback performance cannot be achieved with a different quality level stream, process 200 continues to 206 at which the current quality level stream is continued to be received and played back.

If it is determined at 208 that improved playback performance can be achieved with a different quality level stream, at 210 a different quality level stream of the same media content is requested and began to be received from the server. In some embodiments, 210 includes selecting a different quality level stream, e.g., from a set of available quality levels, that results in improved playback performance given the current availability of client resources such as the current network connection speed. At 212, the media player transitions, e.g., mid-stream, from the current quality level stream that is currently playing to the stream having the different quality level requested at 210, and process 200 continues at 206 at which the stream with the different quality level is received from the server and played back at the client. In some embodiments, the transition at 212 includes simultaneously and synchronously playing the different quality level stream behind the current quality level stream, fading out the current quality level stream, and disconnecting the current quality level stream so that only the different quality level stream remains. In some embodiments of process 200, step 208 is periodically performed while the requested media content is played and/or when a playback problem is encountered to determine whether a step up or down of the current quality level improves playback performance at the client. The quality level of the media content being played may be dynamically adjusted any number of times via steps 208-212 of process 200 in accordance with variations in the availability of client resources to receive and playback the media content. Process 200 ends, for example, when the requested media content has completed playing or when an option to stop playback is invoked.

In some embodiments, a highest available quality level stream of a requested media content is initially selected. If a media player playing the highest quality level stream does not run out of data and/or fall behind, it continues playing the highest quality level stream since current client resources are sufficient to handle the best quality available. However, if substantial playback problems (e.g., buffering problems such as an associated buffer emptying or running low, etc.) are detected, the media player, in some embodiments, is configured to assess the throughput of the connection over which the stream is being received. For example, a network connection speed test may be conducted when playback problems are detected and/or periodically during playback. In some such cases, for example, the quality of the connection is represented as a percentage computed from the number of seconds (or other time interval) of playable media content received over a prescribed period of time. For instance, 4 seconds of playable video data received over a time period of 5 seconds comprises an 80% connection. In other embodiments, any other appropriate measurement of the quality of the connection may be made. In some embodiments, the measured quality of the connection is compared to one or more prescribed thresholds and/or available bitrates to determine whether to step down to a lower quality level stream.

As an example, consider that a requested video is published in bitrates of 2000 Kbps, 750 Kbps, 500 Kbps, and 300 Kbps. In some embodiments, initially a connection is made to the highest quality 2000 Kbps stream. If the client is able to support the highest quality level stream, it is continued to be played since it is the best available quality level. However, if playback problems, such as stuttering or buffering problems, are detected, a determination of the quality of the connection is made and compared to a threshold associated with stepping down to a lower quality level stream. For example, if less than an 80% connection is detected, the quality level may be stepped down by one level to 750 Kbps. In some embodiments, the quality level is stepped down one level at a time. In other embodiments, the quality level may be stepped down by more than one level. For example, if the connection is greater than or equal to 60% but less than 80%, the quality level is stepped down to 750 Kbps; if the connection is greater than or equal to 30% but less than 60%, the quality level is stepped down to 500 Kbps; and if the connection is less than 30%, the quality level is stepped down to 300 Kbps.

In some embodiments, when not already playing the highest available quality level stream, the media player is configured to determine at prescribed periods or intervals if a higher quality level than the current quality level being played can be supported so that a better quality level stream can be obtained if it can be supported by the client. In some embodiments, while a current quality level stream is being played, the media player may periodically conduct a network connection speed test to determine whether a higher available quality level or bitrate can be supported. In some embodiments, while a current quality level stream is being played, the media player periodically connects to a next higher quality level stream for a short period of time to test the connection. The result of the test is compared to a threshold and used to make a decision of whether to step up to the next higher quality level stream or to stay with the current quality level stream. With respect to the previous example, for instance, while the media player is playing the 500 Kbps stream, it periodically additionally connects to the 750 Kbps stream for a short period of time to determine if the 750 Kbps stream can be supported. For example, if more than an 80% connection with the 750 Kbps is detected, the quality level may be stepped up to 750 Kbps. In various embodiments, the quality level may be incrementally stepped up by one or more levels at a time. In some embodiments, the intervals at which the determination of whether a higher quality level stream can be supported is made may be increased over time so as not to stress the connection of the stream being played. For example, after connecting to and playing a stream with a given quality level (that is not the highest available quality level), a network connection speed test may be conducted and/or a connection with a higher quality level stream may be tested every 10 seconds for awhile and then every 20 seconds and then every 40 seconds and so on. Thus, attempts are made to switch to a higher quality level stream without unduly stressing the connection with the stream currently playing.

Figure 3:
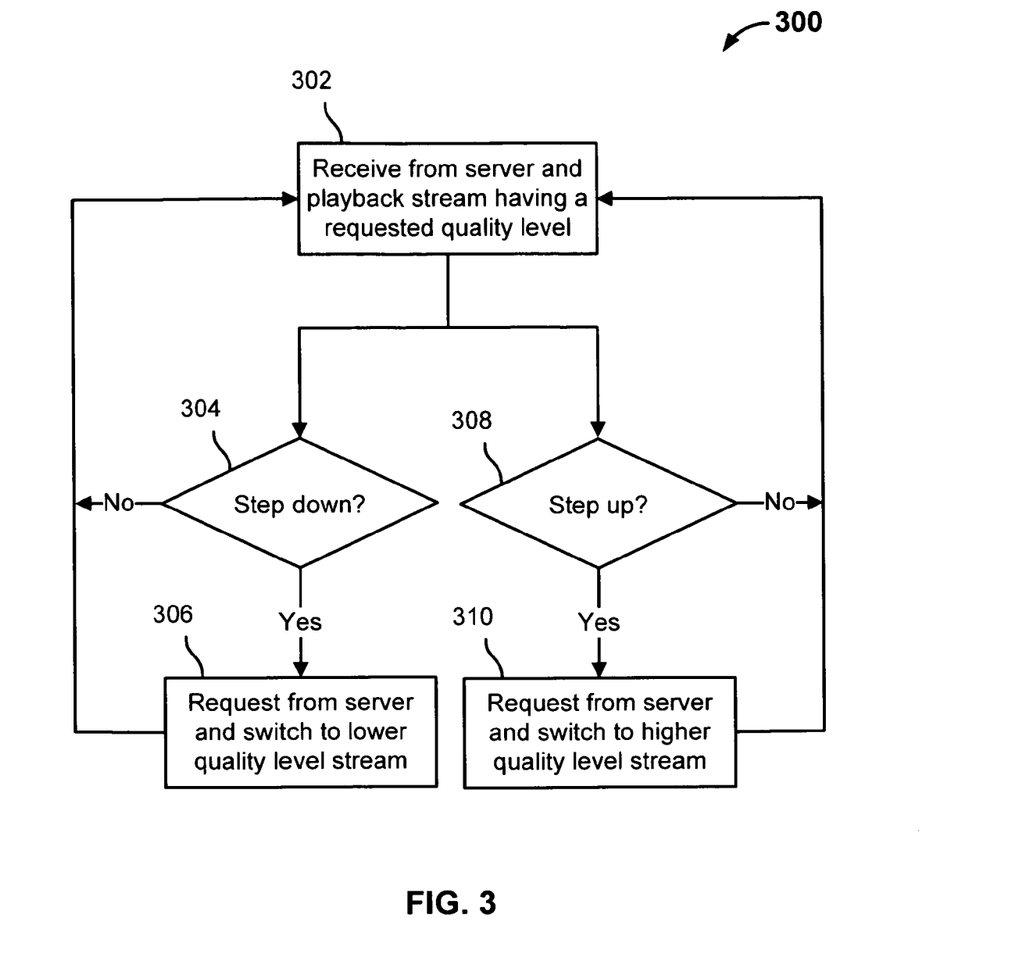
FIG. 3 illustrates an embodiment of a process for dynamically adjusting stream quality level.

FIG. 3 illustrates an embodiment of a process 300 for dynamically adjusting stream quality level. In some embodiments, process 300 is employed client-side by a media player that plays requested media content. With respect to FIG. 1, for example, process 300 may be employed by a client 102 when receiving requested media content from server 104. Process 300 starts at 302 at which a stream having a requested quality level is received from an associated server and played back at a client. In some embodiments, the quality level of the stream received at 302 comprises the highest or best quality level published by the server. At 304, it is determined whether to step down the quality level. In some embodiments, the determination of 304 is made in response to a network connection speed test. In some embodiments, the determination of 304 is made in response to playback problems, such as an associated buffer emptying or running low, and an assessment of the quality of the current connection. In some embodiments, 304 includes determining whether a threshold associated with stepping down the quality level is satisfied. If it is determined at 304 to not step down the quality level, process 300 continues at 302 at which the currently playing stream is continued to be received and played. If it is determined at 304 to step down the quality level, the client requests from the server and switches to a lower quality level stream at 306, and process 300 continues at 302 at which the stream having the lower quality level is received and played. At 308; it is determined whether to step up the quality level. In some embodiments, the determination of 308 is made periodically or at prescribed intervals, e.g., when the highest available quality level stream is not currently playing. In some embodiments, the determination of 308 is made in response to a network connection speed test. In some embodiments, the determination of 308 is made in response to a connection test with a higher quality level stream. In some embodiments, 308 includes determining whether a threshold associated with stepping up the quality level is satisfied. If it is determined at 308 to not step up the quality level, process 300 continues at 302 at which the currently playing stream is continued to be received and played. If it is determined at 308 to step up the quality level, the client requests from the server and switches to a higher quality level stream at 310, and process 300 continues at 302 at which the stream having the higher quality level is received and played. Process 300 ends, for example, when the requested media content has completed playing or when an option to stop playback is invoked.

Figure 4:
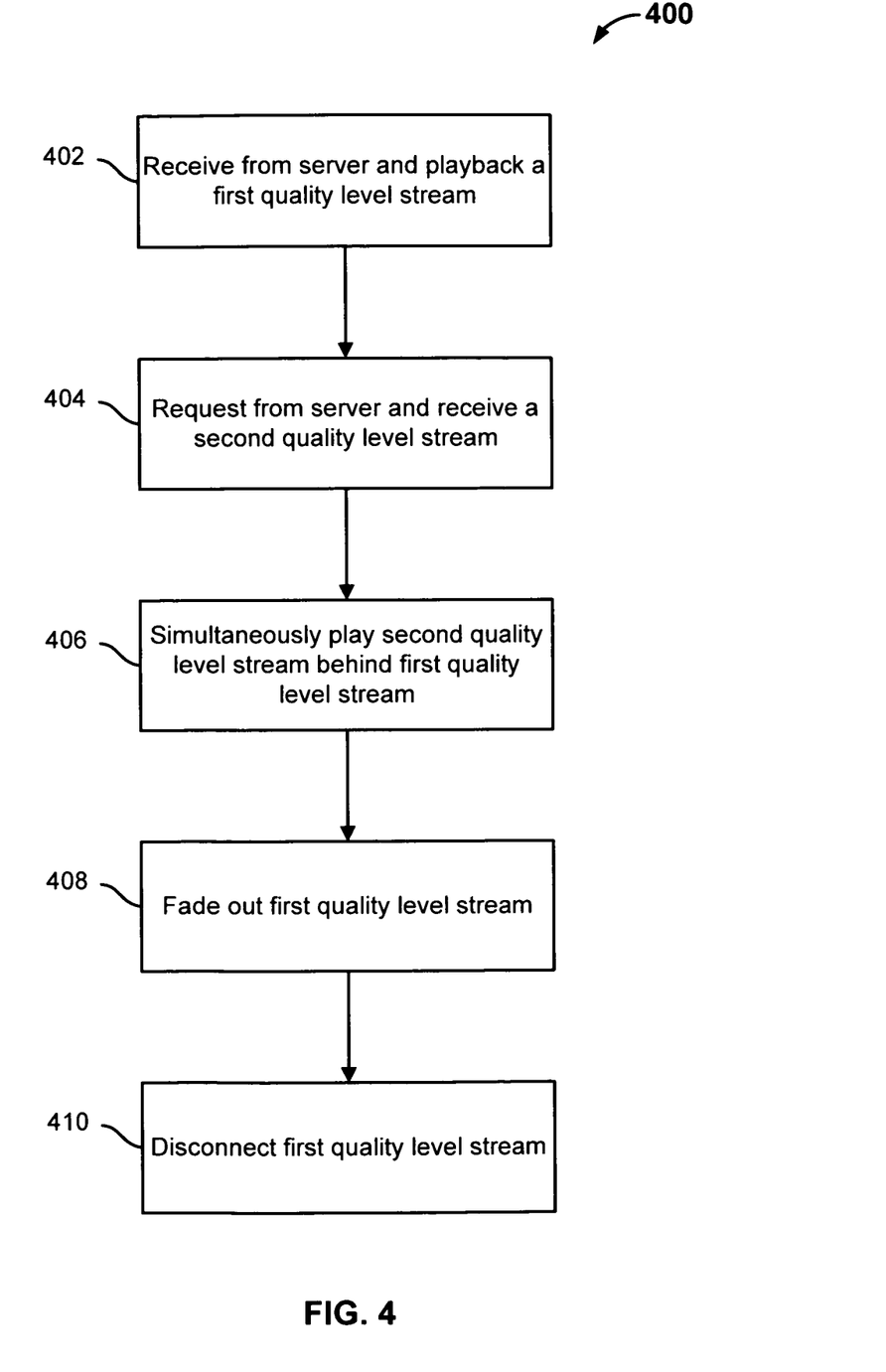
FIG. 4 illustrates an embodiment of a process for switching between different quality level streams.

FIG. 4 illustrates an embodiment of a process 400 for switching between different quality level streams. For example, process 400 may be employed by a media player for transitioning at 212 of process 200 of FIG. 2 or for switching at 306 and 310 of process 300 of FIG. 3. Process 400 starts at 402 at which a first quality level stream is received from an associated server and played back, e.g., by an associated media player at a client. At 404 a second quality level stream is requested and received from the server. In some embodiments, receiving the second quality level stream at the client at 404 includes buffering the second quality level stream. At 406, the second quality level stream is simultaneously played behind the first quality level stream. In some embodiments, 406 includes synchronizing the second quality level stream with the first quality level stream, which is continued to be played during 404 and 406 of process 400. In some embodiments, metadata and/or cue points may be injected server-side into the various quality level streams, e.g., at prescribed time codes or key frames, to facilitate client-side synchronization of streams. At 408, the first quality level stream is gradually faded out while the second quality level stream continues to be played behind the first quality level stream. Eventually, the first quality level stream is completely faded out, and only the second quality level stream remains, completing the transition. Once the first quality level stream has been completely faded out, the first quality level stream is disconnected at 410, and process 400 subsequently ends. In some embodiments, switching between different quality level streams using process 400 results in a nearly seamless transition. In such cases, other than a possibly noticeable change in the quality level of the stream being played, the transition is in many cases undetectable to an end user.

In some embodiments, the requested media content comprises live content that is generated and provided in nearly real time. A live stream is provided starting from a most current position at the time it is requested. The total length of a live stream to be played is not known a priori. Thus, a client connecting to a live stream receives the stream starting from a point that corresponds to and/or is around the connection time, and the associated stream or file continues growing indefinitely at the client as data is received until, for example, the stream ends or playback is stopped. With respect to process 400 of FIG. 4, when transitioning, a second quality level live stream is received starting from a position that corresponds to the time it is requested at 404. Meanwhile, a first quality level live stream is already playing in nearly real time. Thus, for live streams, received data comprising the different quality level streams is nearly synchronized in time, and, in some embodiments, no additional synchronization is needed when transitioning between different quality level live streams.

The (average) bitrate of a live stream cannot be determined since the total size and length of the live stream are not known a priori. For a given resolution of encoding, the real time bitrate may vary significantly depending on the content of the stream. For example, for the same resolution, video content on whales may have a relatively lower bitrate compared to video content of a basketball game. The quality levels of live content, therefore, are not associated with fixed bitrates. In some embodiments, moving average bitrates are determined server-side for streams of live content, e.g., as the streams are encoded, that reflect the current average bitrates of the streams over a prescribed window or interval of time, such as a minute. In some cases, such current average bitrates are used client-side when making a determination of whether to step up or down to a different quality level. Since the bitrates of live streams cannot be predetermined, it is useful and more meaningful to make a determination of whether to step up or down in quality level based on current average bitrates. In some embodiments, the current average bitrates are determined and stored (e.g., in XML files) server-side as the streams are encoded and provided to a client when requested, e.g., when the client is making a determination of whether to switch to another higher or lower quality level stream.

In some embodiments, the requested media content comprises on-demand content, i.e., pre-stored content provided upon request. The (average) bitrate of an on-demand stream is known since the total size and length of the stream are known. Thus, the various available stream quality levels of on-demand content can be associated with fixed bitrates. Unlike live content which is provided starting from a current position in the stream when it is requested, on-demand content is typically provided starting from the beginning of the stream. However, a transition between different quality level streams occurs mid-stream. Thus, for on-demand content, when transitioning to a different quality level stream, that stream is in some embodiments requested by the client at a client specified start point. For example, a client request for a stream may include a time code indicating the starting point from which the requested stream is desired. In some embodiments, an associated server is configured to parse such a client request and serve the requested stream starting from the specified start point. For example, it may be determined 30 seconds into the playback of a first quality level on-demand stream that a second quality level on-demand stream of the same content would result in improved playback performance. In some embodiments, the second quality level stream is requested starting from a prescribed time interval ahead of the current playback time (30 seconds in the given example) of the first quality level stream. With respect to the given example, for instance, the second quality level stream may be requested starting from 35 seconds into the stream, so that there are 5 seconds to receive and buffer data comprising the second quality level stream at the client before fading out the first quality level stream. Thus, for on-demand content, synchronization of different quality level streams may be achieved by requesting the stream that is being transitioned to starting from a prescribed interval of time ahead of the current playback time.

As described herein, automatically and dynamically adjusting stream quality level during playback based on the availability of current client resources provides an improved playback performance for the end user. In some embodiments, the user interface of a media player may include an option for an end user to manually switch between different available quality level streams, and the described techniques may be similarly employed to transition between different quality level streams when such an option is selected by the end user.

Figure 5A:
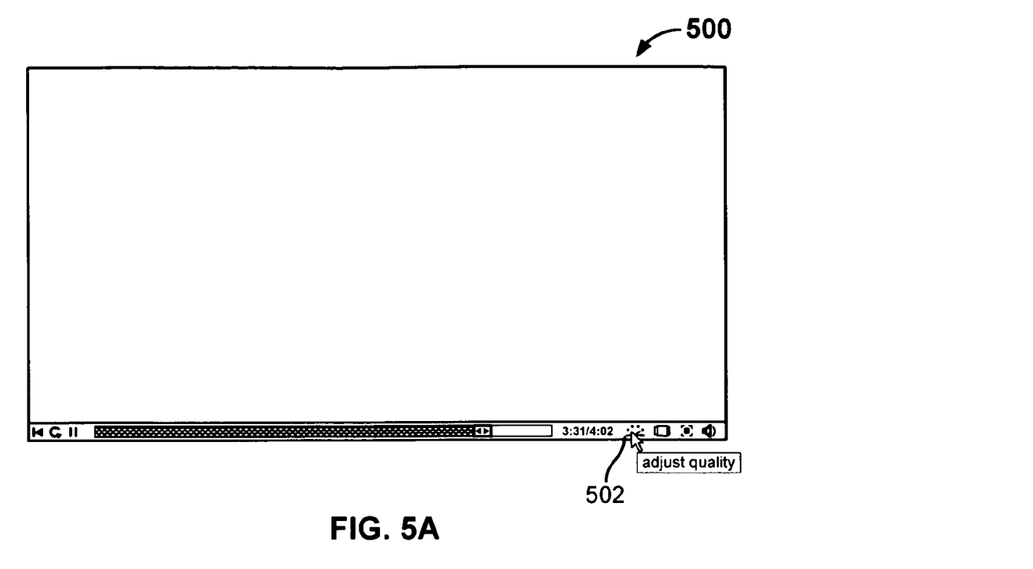
FIGS. 5A-5B illustrate an embodiment of a user interface of a media player.
Figure 5B:
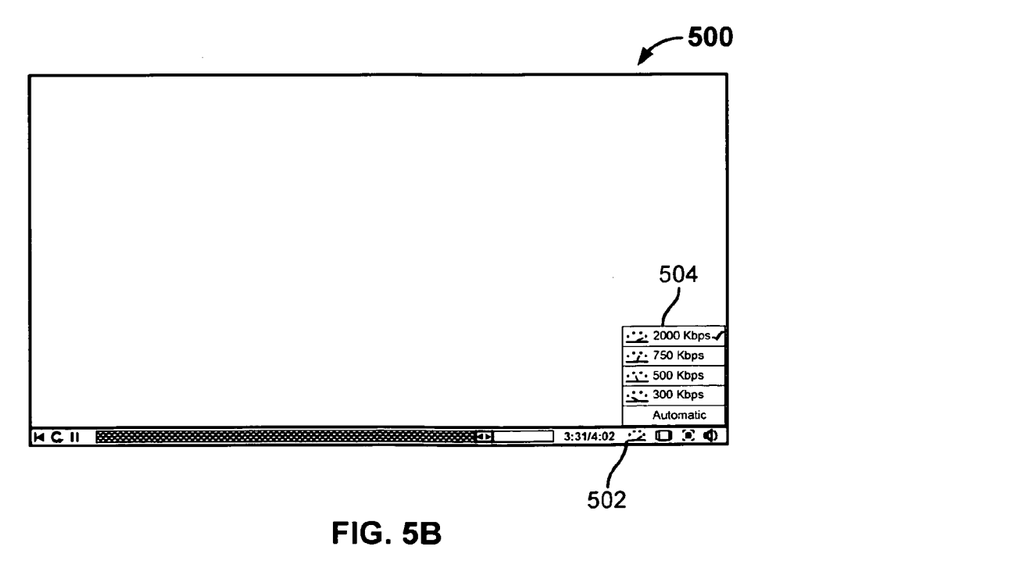

FIGS. 5A-5B illustrate an embodiment of a user interface of a media player 500. In some embodiments, media player 500 comprises a custom media player. In various embodiments, media player 500 may comprise an external application at a client or an embedded player in a website being accessed by a client. In some embodiments, media player 500 is configured to automatically and dynamically adjust stream quality level during playback based on the current availability of client resources. As depicted, media player 500 includes various standard playback options as well as an option 502 to manually adjust stream quality level or bitrate. As depicted in FIG. 5B, menu 504 for selecting from available bitrates is presented in response to the selection of option 502 to adjust quality. In the given example, menu 504 includes options to select from four available bitrates in which the requested content is published as well as an option to allow a bitrate to be automatically selected and/or adjusted by the player.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for playing media content, comprising:
a processor in a client; and
at least one memory device in the client that stores a plurality of instructions, which when executed by the processor, causes the processor to operate to:
play a first stream having a first quality level of the media content;
determine, by the client, that a different available quality level of the media content would result in improved playback performance;
send, by the client, a request to a server for a second stream based on the determination;
receive, at the client, the requested second stream;
play simultaneously with the first stream, the second stream having a second quality level of the media content, wherein the second quality level is associated with the different available quality level and the second stream is played in a background; and
disconnect the first stream while the second stream remains playing.

2. The system recited in claim 1, wherein the first stream and the second stream comprise different resolutions of encoding of the same media content.

3. The system recited in claim 1, wherein each of the first quality level and the second quality level comprises a different bitrate of the media content.

4. The system recited in claim 1, wherein the processor is further operable to play the second stream including by playing the second stream at a starting point other than a beginning of the second stream.

5. The system recited in claim 1, wherein the second quality level comprises a lower quality level than the first quality level.

6. The system recited in claim 1, wherein the second quality level comprises a higher quality level than the first quality level.

7. The system recited in claim 1, wherein the processor is further operable to conduct a network connection speed test.

8. The system recited in claim 1, wherein the processor is further operable to detect a playback problem while playing the first stream and assess a quality of a network connection with the first stream.

9. The system recited in claim 1, wherein the processor is further operable to conduct a connection test with a higher quality level stream than the first quality level, while playing the first stream.

10. The system recited in claim 1, wherein the processor is further operable to determine that a threshold to switch to the second quality level stream is satisfied.

11. The system recited in claim 1, wherein the processor is operable to disconnect the first stream including by being configured to fade out the first stream, and disconnect the first stream once it has completely faded out.

12. The system recited in claim 1, wherein the processor is further operable to request the second stream starting from a specified start point.

13. The system recited in claim 1, wherein the media content comprises live content or on-demand content.

14. A computer program product for playing media content, the computer program product being embodied in a non-transitory computer readable storage medium and comprising computer instructions for:
   playing a first stream having a first quality level of the media content;
   determining, by a client device, that a different available quality level of the media content would result in improved playback performance;
   sending, by the client device, a request to a sever for a second stream based on the determination;
   receiving, at the client device, the requested second stream;
   playing simultaneously with the first stream, the second stream having a second quality level of the media content, where in the second quality level is associated with the different available quality level and the second stream is played in a background; and
   disconnecting the first stream while the second stream remains playing,
   wherein the computer program product is a client computer program product.

15. The computer program product embodied in the non-transitory computer readable storage medium recited in claim 14, wherein the first stream and the second stream comprise different resolutions of encoding of the same media content.

16. The computer program product embodied in the non-transitory computer readable storage medium recited in claim 14, wherein playing the second stream comprises playing the second stream at a starting point other than a beginning of the second stream.

17. The computer program product embodied in the non-transitory computer readable storage medium recited in claim 14, further comprising computer instructions for determining that a threshold to switch to the second quality level stream is satisfied.

18. A method for playing media content, comprising:
   playing a first stream having a first quality level of the media content;
   determining, by a client device, that a different available quality level of the media content would result in improved playback performance; and
   sending, by the client device, a request to a sever for a second stream based on the determination;
   receiving, at the client device, the requested second stream;
   playing simultaneously with the first stream, the second stream having a second quality level of the media content, where in the second quality level is associated with the different available quality level and the second stream is played in a background; and
   disconnecting the first stream while the second stream remains playing,
   wherein said method is performed on the client device.

19. The method recited in claim 18, wherein the first stream and the second stream comprise different resolutions of encoding of the same media content.

20. The method recited in claim 18, wherein playing the second stream comprises playing the second stream at a starting point other than a beginning of the second stream.

* * * * *